Figure 1:
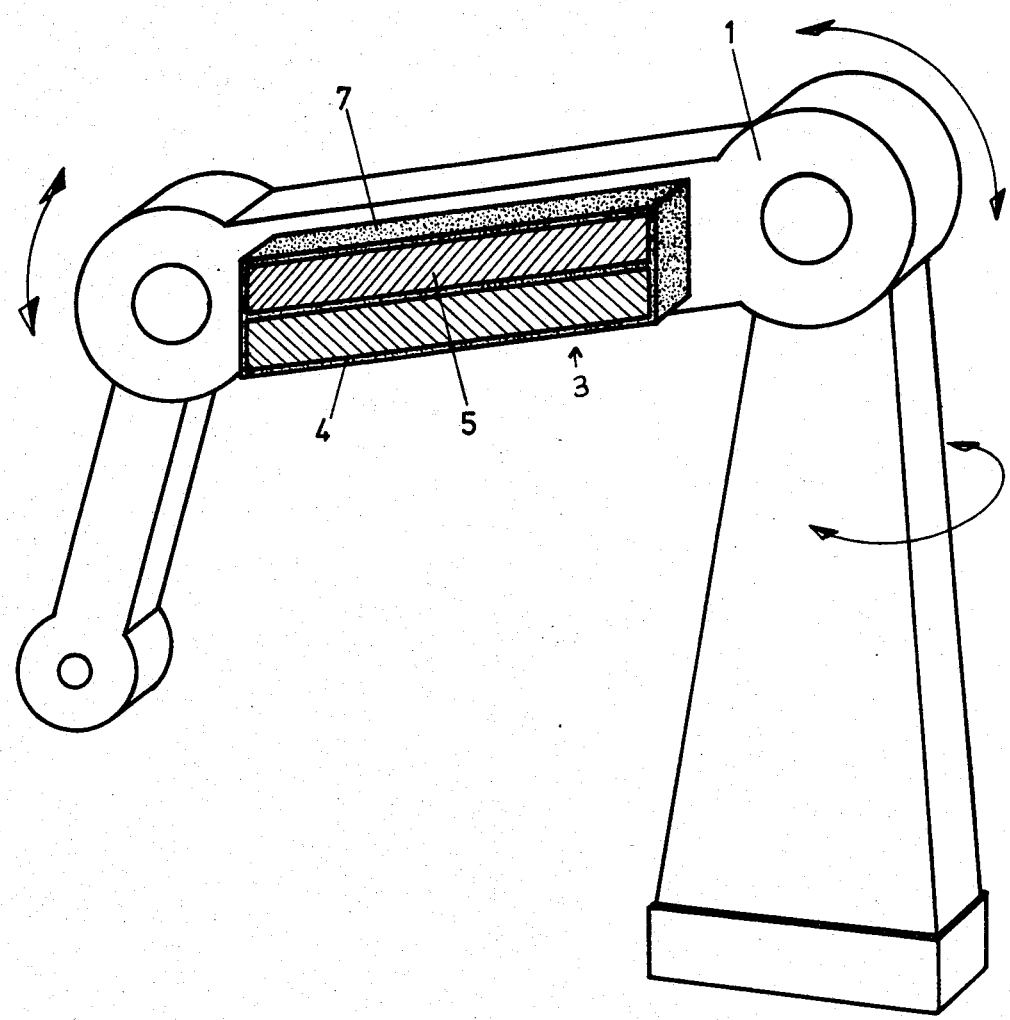

United States Patent [19]

Schmall

[11] Patent Number: 4,661,797
[45] Date of Patent: Apr. 28, 1987

[54] ELECTRONIC WARNING AND MONITORING APPARATUS AND ELECTRODE ARRANGEMENT THEREFOR

[75] Inventor: Karl-Heinz Schmall, Baden-Baden, Fed. Rep. of Germany

[73] Assignee: Get Gesellschaft fur Elektroniktechnologie mbH, Baden-Baden, Fed. Rep. of Germany

[21] Appl. No.: 720,671

[22] Filed: Apr. 8, 1985

[30] Foreign Application Priority Data

Apr. 9, 1984 [CH] Switzerland .................. 1777/84

[51] Int. Cl.⁴ .................................. G08B 13/26
[52] U.S. Cl. .................................. 340/561; 324/59; 331/65; 340/540; 340/562; 340/563; 340/679; 340/825.06; 901/49
[58] Field of Search ............ 340/561, 563, 562, 679, 340/540, 825.17, 825.18, 825.06; 324/59, 61 P; 331/65; 901/49, 46; 318/565, 563

[56] References Cited

U.S. PATENT DOCUMENTS

| 2,064,994 | 12/1936 | Stirlen et al. | 340/562 |
| 3,678,378 | 7/1972 | Trott et al. | 324/61 P |
| 3,836,828 | 9/1974 | Siegel | 340/563 |
| 4,208,695 | 6/1980 | Noda et al. | 340/563 |
| 4,332,989 | 6/1982 | Nicholaisen | 901/49 |
| 4,433,309 | 2/1984 | Hermle et al. | 340/562 |
| 4,490,660 | 12/1984 | Tsuchihashi | 318/563 |

Primary Examiner—Glen R. Swann, III
Attorney, Agent, or Firm—William R. Hinds

[57] ABSTRACT

The invention relates to a monitoring and warning apparatus for automatic processing apparatuses, in particular robots. Reactance-determining elements are arranged as sensors on the movable parts of the robot. If the robot arm approaches an object, detuning of the sensor circuit occurs. In that way, it is possible to produce a monitoring or stop signal. A central supply with HF-signals and current permits central monitoring of the function of the sensor circuits and at the same time triggering of warning signals when the sensor approaches an object. That is achieved in that the warning signals derived from sensor signals are used to connect additional loads into the circuit which is supplied from the central current supply means. Therefore, by monitoring the current consumption, it is possible to detect both failure of individual sensor circuits and also the approach of an object to a sensor.

10 Claims, 8 Drawing Figures

ELECTRONIC WARNING AND MONITORING APPARATUS AND ELECTRODE ARRANGEMENT THEREFOR

The invention relates to an electronic warning and monitoring apparatus for an automatic processing apparatus, in particular for robots.

Automatic processing or handling equipment generally performs certain programmed movements. Particularly in the case of robots which are provided with a plurality of axes, the combination of various movements about axes, which movements generally also occur simultaneously, gives rise to complicated forms of movement of the robot as a whole. A person who is in the vicinity of the robot cannot see what movements the robot will be carrying out at the next moment. The speeds of movement of robots are ever increasing, in order to cut the working times down as far as possible. Particularly in regard to the programming of robots, endeavours have been made to reduce the periods of time that the robot requires for reaching certain operating positions.

It is precisely in that state of movement however that a robot must generally cover the greatest distances. As a result, the movements through space are becoming very fast, with speeds of some metres per second being quite usual. The motion program of a robot begins suddenly and generally without any advance warning by means of an acoustic or optical signal so that a person standing close to the robot can be completely surprised by the sudden commencement of the movement. Under some circumstances, such a person is then no longer capable of moving to a safe distance, and accidents result.

In order to prevent such accidents, devices have been developed, which permit monitoring of a certain area around the robot by optical means, for example light barriers, light curtains, laser beams etc, and also by ultrasonic means or by simple contact means. When a person penetrates into the protected area, such monitoring apparatuses respond and produce warning signals or switch off the movement of the robot. Also known are safety devices wherein cushion-like resistance sensors comprising an elastic conductive material are arranged directly on the arms of the robot; when the arm of the robot strikes against an obstacle, for example parts of the body of a person, the sensors make the impact elastic. It has also already been proposed that the compression of the conductive elastic material should cause a change in the ohmic resistance or the reactance in a monitoring circuit which outputs a stop command to the robot control means.

However, the previously known monitoring devices suffer from a number of disadvantages. Particularly in a situation which involves monitoring a space, the limits of the space being monitored cannot be clearly established. In practice, it is necessary for the space being monitored to be substantially larger than the working region (region of movements) of the robot, which considerably increases the amount of space required for robot working areas.

More specifically, nobody may be in the monitored space, even when the working area of the robot cannot in any way fill up that space.

In addition, in movement-sensitive monitoring devices, the robot movement itself is restricted because the monitoring device which seeks to detect the approach of a person can also respond to the movement of the rotor when it moves into the space being monitored. That disadvantage also restricts the use of such space-monitoring installations.

The known safety devices generally do not permit constant self-testing for operational safety without a restriction, in respect of time, of operational readiness. However, the authorities who deal with accident prevention set a very high standard in regard to operational reliability of such monitoring devices, which make it necessary to provide automatic, interruption-free and continuous self-testing at very short periods of time (several times per second).

The object of the present invention is to overcome the disadvantages of the known art and in particular therefore to provide a warning and monitoring apparatus which can already produce a danger signal when the robot arm or robot hand approaches an article or a person, during such movement. In addition, the invention seeks to ensure fail-safe monitoring, with a simple construction in respect of the monitoring apparatus and the electrode. In accordance with the invention, that is primarily achieved in that at least two sensor circuits are provided for the movable parts of the processing apparatus, that the sensor circuits each have at least one sensor electrode having a capacitive and/or an inductive operational portion which is disposed on a movable part and which is connected as a frequency-defining or reactance-defining element into an L/C-circuit and/or as a member of an ac bridge circuit which operates with an operating frequency of at least 10 kHz, and that the inductive and/or capacitive operational portion is insulated by an insulating element and is arranged in a high-resistance manner relative to the processing machine in such a way that the approach of an electrically conductive body, in particular a metal object or a human being, can produce a change in the inductive and/or capacitive reactance, and that the L/C circuit is connected to a trigger circuit for triggering off a signal, in particular a warning or cut-out signal, upon a change in the L/C circuit frequency or unbalancing of the bridge circuit, wherein a central control circuit is provided for producing a warning or cut-out signal, said circuit being connected to the output of the trigger circuit of the sensor circuits.

The capacitive or inductive sensor operate in an electrical oscillator circuit or in a bridge circuit in such a way that the change therein results in a change in the oscillator circuit properties or the bridge voltage, which can be evaluated in known electronic means for producing approach or collision signals. Upon the approach of an electrically conductive body such as human limbs or also upon approaching metal articles, the capacitance of such a sensor and, in the case of metal articles, also the inductance, is altered. Capacitance and inductance are arranged in a circuit in such a way that they either:

1. directly determine the frequency of an oscillator circuit which acts as a frequency-determining member in an electrical oscillation generator, or 2. they are arranged in a frequency-selective evaluation circuit or bridge circuit in which, by virtue of their change, they produce unbalancing and thus make it possible to detect deviations from predetermined data, as a collision signal.

It will be seen that the monitoring apparatus is made in particular more reliable by virtue of the fact that a signal which rises with increasing proximity is produced in a quasi-stepless manner, that signal reaching a maximum upon mechanical contact between a body and the electrode.

It is particularly advantageous if the evaluation circuit has an arrangement for determining the change in frequency per unit of time and/or for filtering out changes in frequency with a predeterminable Δt. In that way it is possible for example to provide that a warning and/or stop signal is triggered off only in the event of high speeds of approach, which lead to the conclusion of the presence of an object in the direct range of movement of the processing or handling apparatus, or the presence of a movable object such as a human being. That may be achieved for example by means of a per se known differencing unit.

The occurence of false alarms may advantageously also be avoided if there is provided a threshold value limiting means which produces warning and/or cut-off signals only upon the attainment of a predeterminable change in capacitance, inductance or frequency. Signals with a lower level may be suppressed in that way, so that the triggering off of warning or cut-off signals can be made dependent both on the speed of approach to an object and also the distance of the object from the robot.

An aspect which is particularly advantageous is the central supply, which is provided in accordance with the invention, for the L/C circuits and/or the ac bridge circuits, by means of an oscillator, as that reduces both costs and also components which are susceptible to trouble, while at the same time permitting central monitoring of the individual sensor circuits in regard to operational readiness or the presence of a cut-off signal. That may be achieved in a particularly advantageous fashion if the arrangement also has a central power supply for the individual sensor circuits, if the trigger circuit of each of the sensor circuits, upon activation as the result of approaching an object, switches an electrical load on or off in such a way that the current produced by the central current supply means alters, and if a current monitoring circuit is connected to the output of the central power supply for supplying a warning signal to the central control circuit when the parameter rises above or falls below a respective reference value. It will be seen that the power consumption of the various sensor circuits may be precisely predetermined. If therefore the power consumption of the central power supply means falls below a predeterminable reference value, one of the sensor circuits is inoperative, or there is some other fault. If in contrast the level of power consumption rises, that may be attributed to the fact that an additional current load has been connected into the circuit by a trigger means, that is to say, an object has been detected in the range of movement of the processing or handling apparatus. In both cases, that is to say both when the current rises above and when it falls below the reference value, a warning signal can be produced by the central control circuit.

It is particularly advantageous to provide an additional monitoring circuit for operational monitoring of the oscillator, which circuit is connected to the output of the oscillator and is advantageously also connected to the central control circuit for triggering a warning signal in the event of failure of oscillator signals. That results in minimization of components and minimization of operational reliability.

The technical advance and the inventive content of the subjectmatter of this application are ensured both by the novel individual features and in particular also by virtue of the combination and sub-combination of the features used.

Figure 2A:
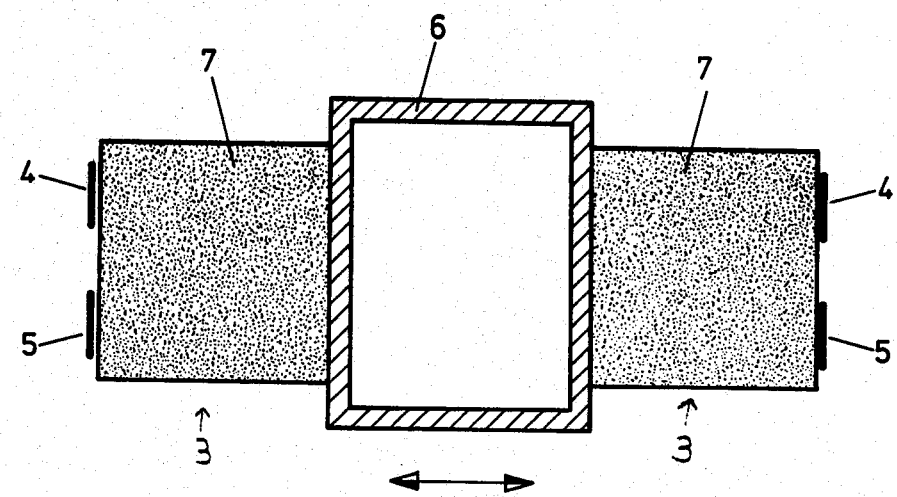
Figure 2B:
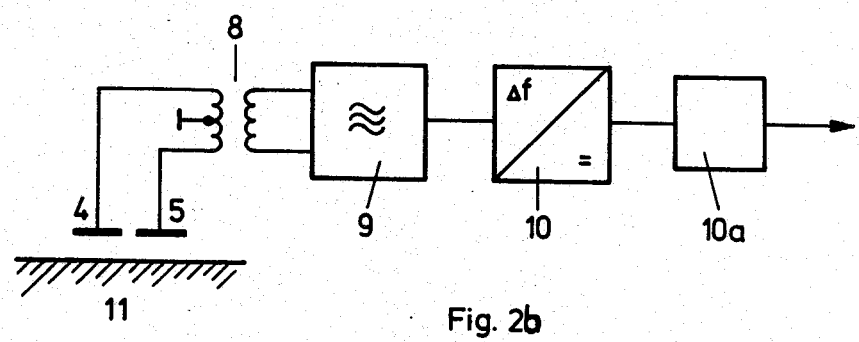
Figure 3:
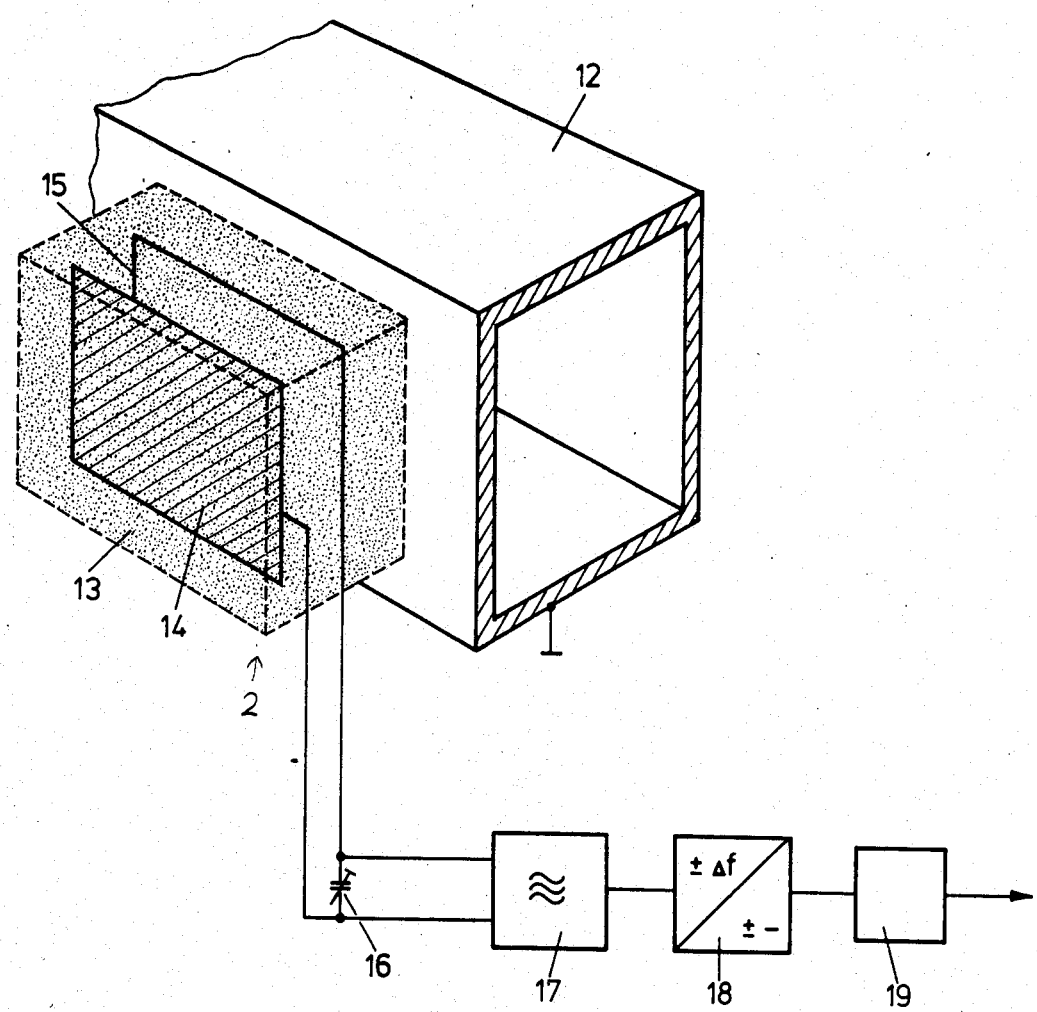
Figure 4:
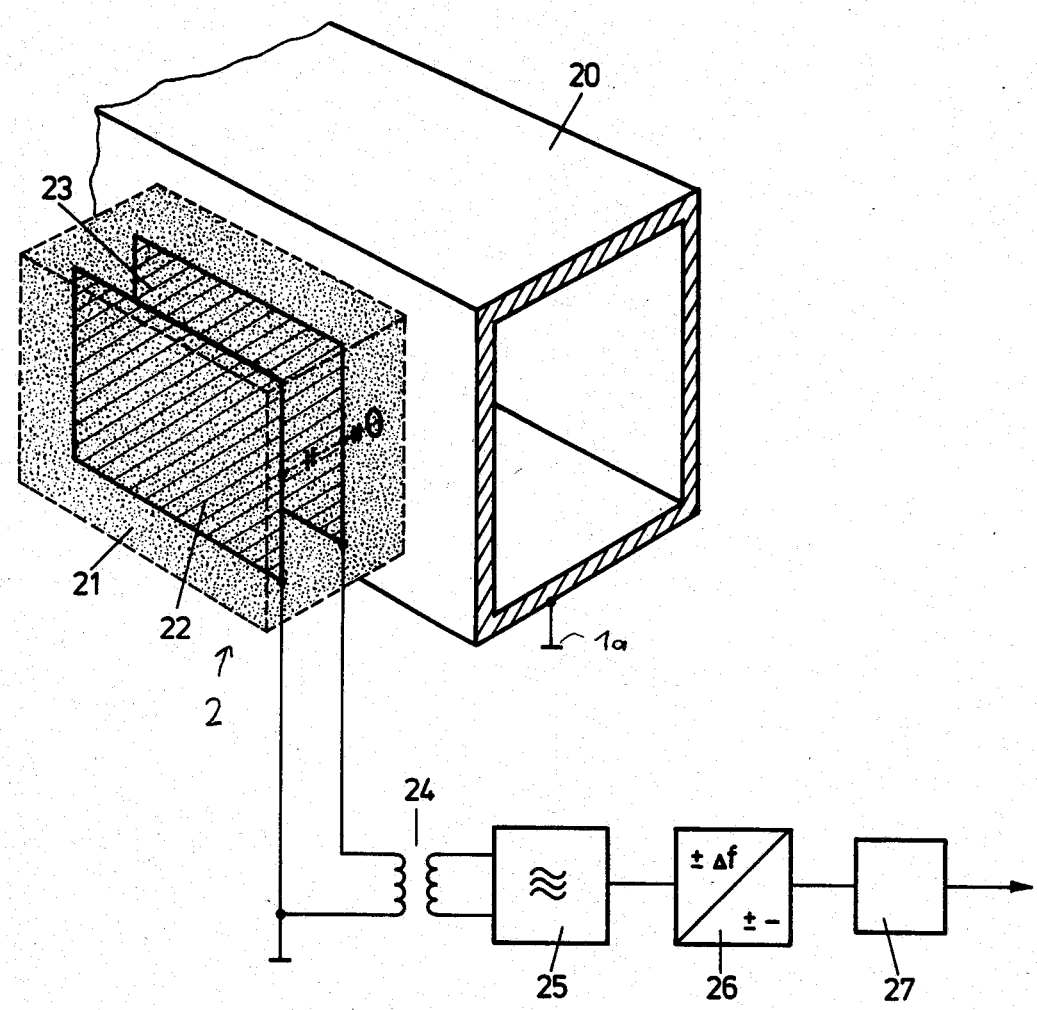
Figure 5:
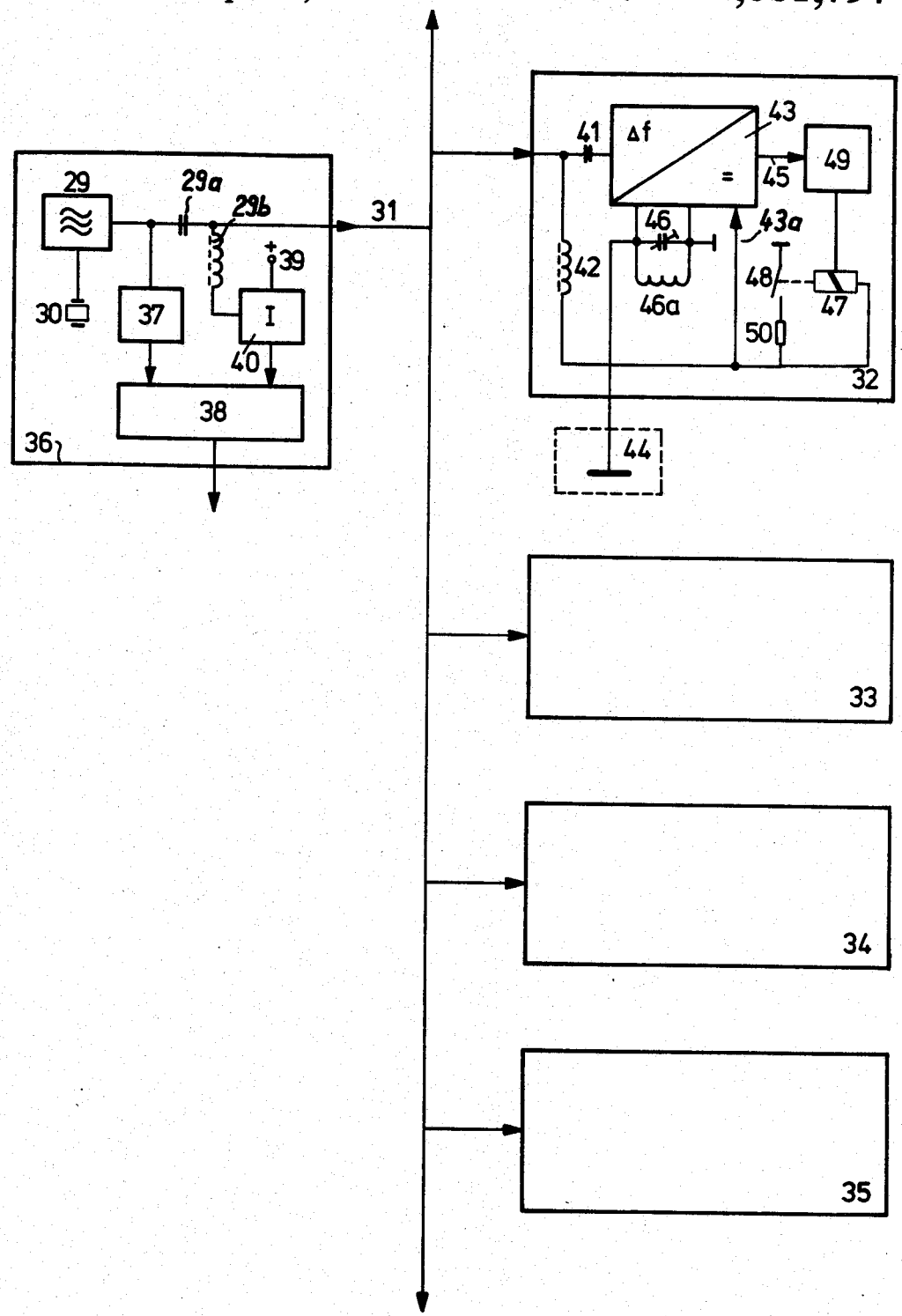
Figure 6:
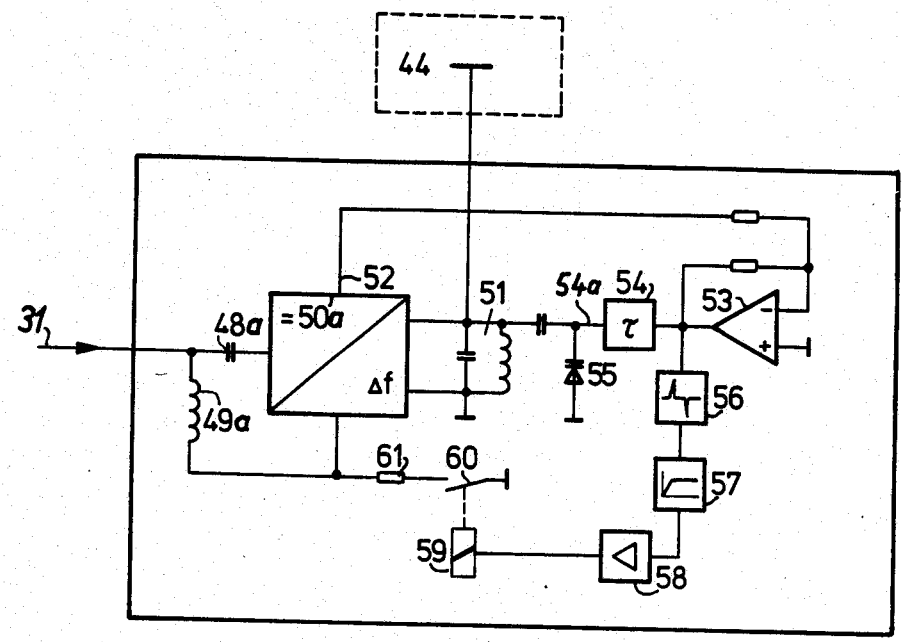
Figure 7:
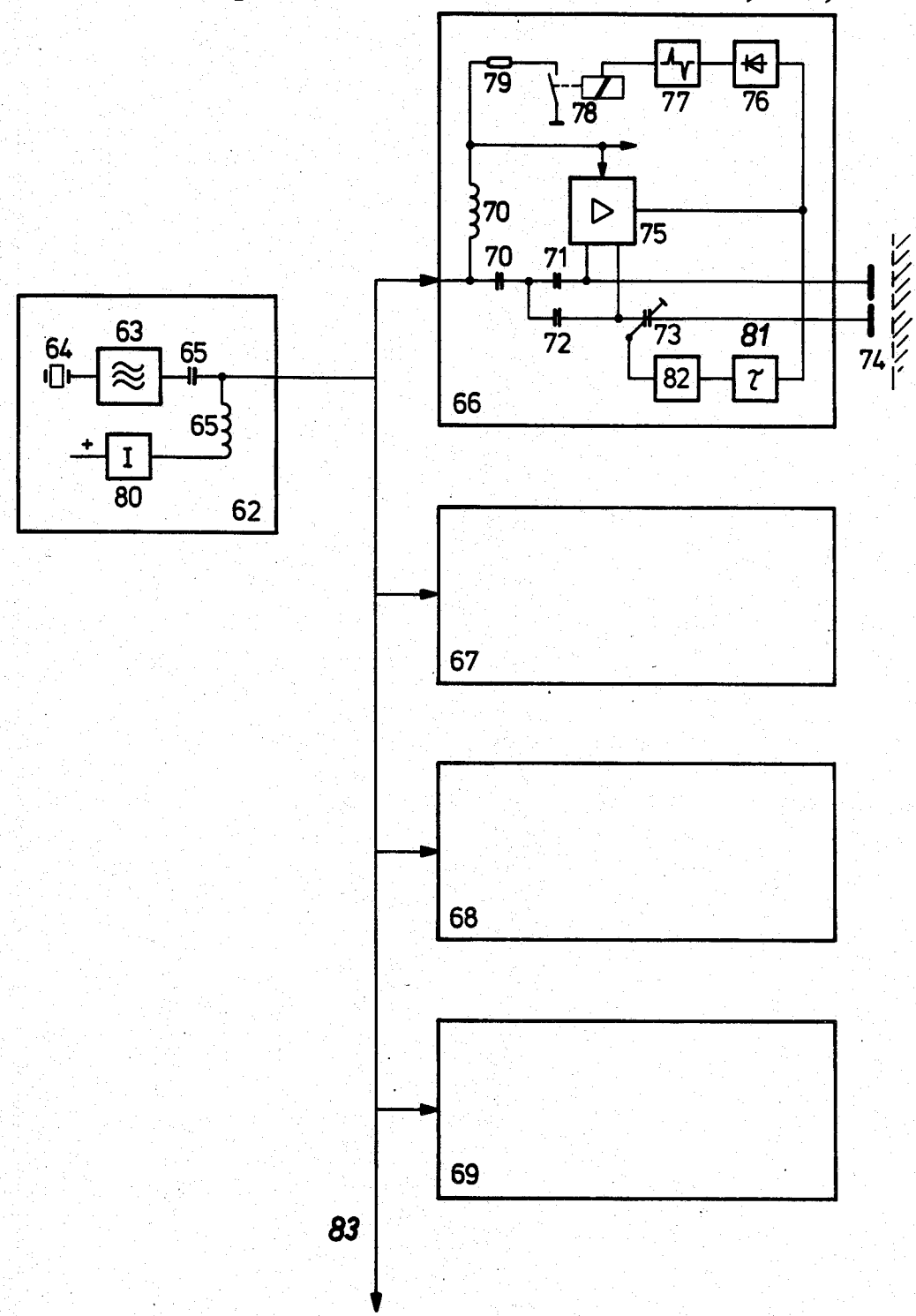

The invention is described in greater detail hereinafter in the following embodiments, with reference to the accompanying drawings in which:

FIG. 1 shows a robot arm with a capacitive sensor disposed thereon,

FIG. 2a shows a view in cross-section through the robot arm and the sensor illustrated in FIG. 1, FIG. 2b shows the circuit of the electronic monitoring apparatus with electrode arrangement as shown in FIG. 2a, FIG. 3 is a diagrammatic view of an inductive electrode arrangement with monitoring apparatus including the features of the invention, FIG. 4 shows an electrode arrangement with a capacitance having a plurality of electrodes, FIG. 5 shows a warning and monitoring apparatus with central oscillator for outputting a constant frequency and a plurality of separate evaluation circuits for the electrode arrangement, FIG. 6 shows a warning and monitoring apparatus with differentiating means, and FIG. 7 shows a modified embodiment of the invention with a bridge circuit.

Referring to FIG. 1, shown therein is a robot arm 1 provided with an electrode arrangement 3 which has two electrode surfaces 4 and 5 acting as capacitance means. The electrode surfaces 4 and 5 are fixed on an elastic, electrically insulating electrode carrier 7. In that arrangement, the electrode surfaces 4 and 5 comprise thin metal foils or films which are secured to the electrode carrier 7 by adhesive means. It will be appreciated however that the electrode carrier itself may also be conductively coated. The symmetrical arrangement of the electrode surfaces 4 and 5 means that it is possible to provide a symmetrical construction of the evaluation circuit relative to ground.

FIG. 2a shows a view in section through the robot arm 1 of FIG. 1. In that connection, it will be apparent that a capacitive electrode arrangement 3 is provided on each side, to permit monitoring of the movement of the robot arm 1 on both sides.

FIG. 2b shows that the electrode surfaces 4, 5 act by way of an HF-transmitter 8 as a frequency-determining element of an oscillator 9. As soon as a body 11 approaches the electrode surfaces 4 and 5, the capacitance thereof alters whereby a frequency change Δf occurs at the output of the oscillator 9. The oscillator 9 is connected to a discriminator 10 in which the change in frequency is converted into a dc signal. That signal is fed by the discriminator 10 to a digital converter 10a which actuates an alarm means (not shown) and a cut-off means for the robot as soon as the change in output signal at the discriminator 10, corresponding to the frequency change Δf, signals that the robot arm 6 or the electrode surfaces 4, 5 are approaching a foreign object.

FIG. 3 shows an inductive electrode arrangement 2 which already responds to metal articles or objects upon approach thereof, but only responds to human bodies when the elastic sensor body begins to be compressed by the collision therewith.

By virtue of that arrangement, it is possible to distinguish between metal objects and human bodies so that the alarm signal can be different depending on the particular obstacle in question. That is a matter of advantage when a distinction must be made between a metal object, for example a fixed part of a machine, and a yielding object, for example part of the body of a person.

If a part of a body is involved, the impact is reduced by the mobility of the part of the body in question. It is therefore possible in that case to stop a rapid robot movement in a reasonable time. If however, due to a programming error, a robot arm were to approach a piece of a machine at very high speed, then under certain circumstances, due to the rigidity of the piece of machinery and the limit condition in regard to being able to stop the movement of the robot arm only over a certain distance, it would often be impossible to prevent the robot arm striking against the piece of machinery at high speed. The result of that would be damage to the robot arm and/or the piece of machinery.

In FIG. 3, reference numeral 12 denotes the robot arm, 13 denotes the elastic electrode arrangement, 14 denotes an elastic metal surface which is arranged outwardly on the top side of the electrode arrangement 13, 15 denotes a coil which is shown as a single turn and which entirely or partially represents the inductance of an oscillator circuit 15/16, 17 denotes the oscillation generating circuit which produces a frequency in dependence on 15 and 16, 18 denotes the discriminator which produces a frequency-dependent voltage at the output and reference numeral 19 denotes the signal evaluating means for the alarm signal. Like the circuit shown in FIG. 2b, the above-indicated circuit is also again set in such a way that, when the robot arm is moving freely, the output voltage of the frequency discriminator 18 does not produce an alarm in the signal evaluating means 19 whereas upon the approach of a metal article before contact, the inductance of the coil 15 is altered to such a substantial degree that the output signal of the discriminator causes the signal evaluating means 19 to respond. In the event of contact with a part of a human body, the change in distance between the elastic metal surface 14 and the coil 15 also causes a change in inductance which in turn alters the frequency of the oscillator 17 and triggers off an alarm by way of the discriminator 18.

FIG. 4 shows an electrode arrangement which has a capacitive electrode surface 22 which is externally grounded. With such an arrangement, the approach to a metal article or to a person is initially not evaluated; the circuit will result in an alarm being given when the elastic sensor carrier is mechanically deformed. When that occurs, the conductive layers 22 and 23 on the elastic sensor carrier 21 are moved towards each other. In addition, due to the general deformation of the sensor carrier 21, the capacitive electrode 23 is also moved towards the metal robot arm 20 so that there is also a change in capacitance from the side. More specifically, the robot arm 20 is grounded (at 1a) and thereby, with the conductive layer 23, forms a capacitance means. Such a sensor arrangement may also be constructed in the form of a multilayer capacitance means from conductive foam so that the total change in capacitance, upon compression of the elastic sensor carrier, can reach high values.

It will be appreciated that mechanical contact is required in this case, in order to be able to trigger off an alarm signal.

The arrangements shown in FIGS. 1 through 4 can each be used in a monitoring apparatus as shown in FIGS. 5 through 7.

FIG. 5 shows a monitoring and warning apparatus having a variable frequency evaluation instead of a variable oscillator frequency, which permits a multiple arrangement of sensors on robot arms, with central detection and monitoring, this being a particularly cost-effective arrangement. Robots are provided with a plurality of axes. They can perform virtually all movements in space and can reach any point in the area of operation. Therefore, it is often necessary to safeguard all moving arms in such a way that collisions with objects and people do not result in damage.

For that reason, it is necessary for each safety means to be monitored in itself so that a check signal can also be produced in the event of failure or breakdown of the safety means.

That can be achieved in a particularly simple fashion with the central system shown in FIG. 5. In that system, an oscillator 29 is provided with a quartz member 30. It supplies a signal at a fixed frequency by way of a coupling capacitor 29a to the central line 31 to which all sensor evaluation circuits 32, 33, 34 and 35, which are of the same construction, are connected.

The number of evaluation circuits which can be connected to the arrangement is virtually unlimited, and only depends on the available output of the generator 36.

Also installed in the central generator 36 is a monitoring circuit 37 which produces an alarm by way of a control circuit 38 as soon as the oscillator 29 fails. The monitoring circuit is in the form of a rectifier arrangement and picks up the output voltage of the oscillator 29. The control circuit 38 has per se known presettable threshold circuits with which fluctuations in current or voltage at the input may be determined and, in the event of deviation from an adjustable reference value, converted into warning signals.

In addition, the same central line 31 which can preferably be in the form of a coaxial cable also provides for the supply of power for the sensors from a current source 39 by way of a current monitoring circuit 40 to the feed line 31. In that arrangement, known means (coil 29b, coupling capacitor 29a) permit separation between the high-frequency energy of the oscillator 29 and the current supply means (direct current).

The power supply for the individual components in the sensors is only indicated in digrammatic form for the frequency-selective circuit 43, at 43a, and for the relay 47, but it is not shown in detail in other respects because that is a matter with which the man skilled in the art is familiar. At any event, the entire circuit arrangement of the sensor 32 is supplied with voltage or current from the current source 39 by way of the line 31 and the coil 42.

The output of the current monitoring circuit 40 is also applied to the control circuit 38. The current flowing from the current source 39 by way of the current monitoring circuit 40 is also fixed in dependence on the number of connected sensors 32 to 35 which in themselves have a constant current demand or requirement, so that monitoring of the failure of the sensors 32 to 35 can be indicated by a corresponding change in current in the current monitoring circuit 40. If the current consumption drops, it is concluded that a sensor 32–35 has failed, and the current monitoring circuit 40 delivers a signal to the control circuit 38 which in turn triggers off a warning signal.

The circuits of the sensors 32 to 35 are the same, so that only one circuit is shown in FIG. 5.

Disposed in the input of the circuits 32 to 35 is a decoupling circuit 41/42 which ensures that the high-frequency component and the direct current component are separated from each other. The frequency-selective circuit 43 is set in such a way that, when the sensor electrode 44 is free or exposed (normal operation), the output voltage at the output 45 is zero. Therefore, the HFsignal of the oscillator 29 does not result in a dc signal at the output. The circuit may be tuned with a balancing or adjusting capacitor 46 or with the inductor 46a.

In that respect, the zero output voltage at the output 45 is not a requirement, it may also be of any other value, if the signal evaluation circuit 49 is suitably adjusted.

Frequency-selective circuits, like discriminators or band pass filters with a variable adjusting frequency are generally known so that the circuit details will not be further described herein.

If in operation variations occur due to a body approaching the electrode 44, the variation in the signal at the output 45 is used in the signal evaluation circuit 49 to switch in a relay switch member 47 which actuates a contact 48. The contact 48 connects the line 31 from the generator 36 to ground by way of a resistor 50 and thus increases the current beyond the limit value which is fixed in the current monitoring circuit, so that as a result an alarm signal is produced by way of the control circuit 38. It will be appreciated that the circuit may also be designed in such a way that, upon activation of the contact 48, the resistor 50 is disconnected from ground so that the current consumption would be reduced. However, that would result in a higher level of current consumption in the normal mode of operation as in that case the resistor 50 would continuously load the current source 39.

FIG. 6 shows a modified evaluation circuit 32 as illustrated in FIG. 5, which includes an additional compensation circuit.

The requirement for the output of the frequency-evaluating circuit to be fixed in such a manner that no signal is produced in the normal mode of operation (without approaching an article or person) requires either highly stable circuits or automatic adaptation to the inevitable variations in capacitance or inductance in the sensor circuit.

FIG. 6 shows an adaptive control circuit of that nature.

In FIG. 6, reference numerals 48a and 49a denote the decoupling circuit between the high-frequency component and the direct current component in the signal of the bus line 31 to which all evaluation circuits 32 to 35 are connected. Reference numeral 50a denotes the frequency-selective circuit whose output is connected to the oscillator circuit 51. The electrode 44 is connected as an additional capacitance to the circuit. Instead of the electrode 44, it would also be possible to have an inductance means disposed in parallel with the inductance means or in series with the inductance means comprising the oscillator circuit 51, as a sensor, without that altering the mode of operation of the circuit.

At the output 52 of the frequency-selective circuit 50, a dc voltage signal is produced, which is passed to an operational amplifier 53, a low pass filter 54 and a voltage-dependent variable capacitor 55 which in turn is connected in parallel with the oscillator circuit 51. Fluctuations in voltage at the output 54a of the low pass filter 54 would consequently cause variations in the capacitance at 55 and thus variations in the tuning of the circuit 51. It is also possible to use other tuning methods of known kind, for example rotary capacitors or inductive variometers with motorised retuning.

The same retuning means may also be used in ac bridge circuits for automatic rebalancing, in known fashion.

In that respect, the voltage at the output 52 is so selected, in respect of its polarity and magnitude, that, by way of the low pass filter 54, slow changes which are produced by variations in the circuit components are automatically regulated out within the circuit 50a, 51, 44, 53, 54 and 55, so that the same voltage is always applied at the input of the detector circuit 56, irrespective of whether the capacitance 44 alters due to slow changes caused by temperature or ageing.

However, as soon as there is a rapid change in the capacitance 44, due to the robot approaching a conductive body, the readjustment action which is determined in the time response by the low pass filter 54 cannot follow, and, at the output of the detector circuit 56 which is formed as a differential means, there is a signal which is passed by way of a threshold value stage 57 to a signal amplifier 58 and to a switch member 59 which is preferably in the form of a relay.

At that point, the load resistor 61 is connected to ground by way of a swtiching contact 60; that causes a rise in the current in the feed line to the sensor, and thereby triggers off an alarm signal in the generator current monitoring means (FIG. 5/36).

A sensor arrangement which can produce alarm signals both for the approach mode and also for the compression mode permits the following particularly advantageous signal production modes to be attained:

Upon approach occurring, a signal is produced, which for example can immediately trigger off an acoustic warning signal in order to give a person in danger an opportunity to escape from the movement of the robot. That would prevent the robot having to stop moving, which would waste time.

As a result, the robot could maintain its function unimpeded, without any waste of time, as long as the person succeeds in rapidly getting clear of the area of movement of the robot.

If however a collision occurs between the person and the robot, the signal which is then produced, upon compression of the elastic sensor body, is then used to stop the movement of the robot.

Therefore, with such a sensor arrangement, it is possible to produce two different and stepped or graduated alarm signals.

In accordance with the invention, a double function of that kind is achieved by virtue of the outer layer of a capacitive sensor acting as a sensor surface for the approach mode, being arranged in such a way that the detuning effect caused by the approach reaches only a given magnitude which, in the evaluation circuit of the electronic sensor arrangement is represented as a given variation in voltage within certain limits.

However, as soon as the elastic sensor body is deformed, the additionally installed capacitive surface gives rise to a greater variation in the frequency of the frequency-determining circuit, which exceeds threshold values so that stop-alarm signals are produced, by way of suitable threshold value limit means.

That may be achieved for example in a very simple fashion by the electrode 23 in the circuit shown in FIG.

4 being connected to ground, and the ground connection of the electrode 22 being removed.

The practical embodiment of the concept according to the invention, as shown in FIGS. 5 and 6, has the advantage of a high degree of flexibility and complete monitoring of all circuits, as is a matter of major significance in regard to maintaining operational security and reliability.

Another advantage of the arrangement shown in FIGS. 5 and 6 is that the frequency used as the oscillator frequency can be a frequency which is generally free for industrial control arrangements so that the stray radiation or radiated interference of sensors in the high frequency range, in regard to the fundamental wave, is no longer relevant.

That means that the general introduction of such systems for monitoring robots, even when the robots are positioned in close juxtaposition in production lines, is not subject to any limits because the monitoring systems, in the manner according to the invention, cannot interfere with each other.

More specifically, it is only necessary for the output of the generator 36 to be set at such a high level that, in relation to interference influences at the same frequency from the exterior, sufficiently large differences between the useful signal and the interference signal are achieved.

FIG. 7 shows an embodiment which in important features corresponds to the embodiment shown in FIG. 5. In that arrangement, in a similar fashion, an oscillator 63 is provided with a quartz member 64. It supplies a fixed frequency to the central line 83 to which all sensor evaluation circuits 66, 67, 68 and 69 are connected. Also provided in the generator 62, besides the oscillator arrangement, is a high pass filter 65 which also delivers the dc voltage produced by a current monitoring circuit 80, to the central line 83. A control circuit as illustrated in FIGS. 5 (38) as well as the monitoring circuit 37 and the current source 39 are not shown for the sake of simplicity. However, the mode of operation is similar in that respect to the embodiment shown in FIG. 5. The current monitoring circuit 80 in FIG. 7 corresponds to reference numeral 40 in FIG. 5.

At its input side, the sensor evaluation circuit 66 has a decoupling circuit 70 which separates the direct current component from the high frequency voltage of the oscillator 63. The high frequency voltage is applied to a bridge circuit which comprises capacitor components 71, 72 and 73. In addition, the two electrodes 74 serve as a fourth bridge capacitor. The bridge may be adjusted by means of the capacitor component 73 which is in the form of a varactor diode. Across the bridge output is a bridge amplifier 75 which supplies an output signal to the rectifier 76 and the low pass filter 81. Together with a returning circuit 82, the low pass filter 81 provides for retuning of the bridge by varying the bridge capacitor 73 if the change in capacitance caused at the electrode 74 by a change in ambient conditions is slow. If however a rapid change in capacitance occurs, the low pass filter 81 is unable to readjust the bridge and the resulting bridge output signal at the bridge amplifier 75 operates the switch member 78 by way of the rectifier 76 and a differential unit 77; the switch member 78 connects a load resistor 79 to ground so that the current consumption by way of the central line 83 rises with a jump, which can be measured in the current monitoring circuit 80. It will be seen that the co-operation of the low pass filter 81 and the circuit 77 make it possible to provide for automatic suppression of interference signals, as can be caused for example upon variations in the greater spacing of the sensor electrode 74, by virtue of variations in the sensor electrode 74 itself, or due to the influences of humidity etc. However, every rapid change in capacitance results in a rapid fluctuation in the signal at the bridge output, which is amplified by the bridge amplifier 75 and which, by way of the switch member 78, causes the fluctuation in current at the central line 83, which results in the alarm being triggered off, by way of the current monitoring means 80.

I claim:

1. A moving machinery safety means comprising: a central monitoring circuit for delivering a warning or control signal upon receipt of an activating signal; a device for detecting changes of an electromagnetic field including in combination a central constant frequency generator, at least two sensor circuits energizing by said central frequency generator, each sensor circuit including as L/C-circuit having at least one sensor-electrode creating an electromagnetic field and comprising a resonance-frequency defining element of the said L/C-circuit for changing the resonance-frequency if the sensor-electrode approaches to or comes in contact with an object, each sensor circuit further including a trigger circuit connected to the output of said L/C-circuit, which trigger circuit includes means for varying the current consumption of the sensor circuit for triggering a change in the said current consumption upon a certain change in the L/C-circuit frequency; a central current supply means which is connected to and supplies the sensor circuits through a common supply line; a current monitoring circuit also connected to the central current supply means for delivering an activating signal to the central monitoring circuit when the current consumption rises above or falls below a respective reference value; and an oscillator monitoring circuit for functional monitoring of the constant frequency generator and for delivering a warning signal if the frequency generator malfunctions.

2. A moving machinery safety means according to claim 1 characterized in that the outputs from the constant frequency generator and from the central current supply means are connected to the common supply line and that means for separating the HF-signals and the supply current are provided.

3. A moving machinery safety means according to claim 1 characterized in that the oscillator monitoring circuit is connected to the central monitoring circuit for supplying an activating signal and triggering a warning signal in the event of failure of the central frequency generator.

4. Moving machinery safety means according to claim 1 characterized in that the sensor circuits comprise at least one evaluation-arrangement for determining the change in the L/C-circuit frequency per unit of time and for filtering out frequency changes with a predetermined Δt.

5. A moving machinery safety means according to claim 4 characterized in that the evaluation-arrangement is a differentiating means.

6. A moving machinery safety means according to claim 4 characterized in that the evaluation-arrangement has a threshold value limiting means which produces warning and cut-out signals only upon the attainment of a predetermined change in frequency of the said L/C-circuit.

7. A moving machinery safety means according to claim 1 including an electrode arrangement which is connected as a frequency-determining element into the L/C-circuit of the sensor circuit of such safety means and which is attached to the movable part of the machinery, characterized in that the electrode arrangement has at least one portion which provides a surface area and which is formed as a capacitance means and which is connected to the movable part of the machinery by means of an electrically insulating, elastic body.

8. A moving machinery safety means according to claim 7 characterized in that the member which serves as a capacitance means is embedded in the electrically insulating body.

9. Moving machinery safety means according to claim 1 characterized in that the sensor circuits comprise at least one evaluation-arrangement for filtering out frequency changes of a predetermined Δt in the L/C-circuit frequency.

10. An electrode arrangement for a moving machinery safety means to be connected to an L/C-circuit for changing the resonance frequency of said L/C-circuit characterized in that at least two electrode-members having a surface area and which serve as capacitance means are disposed with an elastic layer therebetween, in such a way that if an object approaches capacitance changes of a certain first degree arise and, if, as a consequence of contact between the electrode arrangment and the object a mechanical pressure is applied to the electrode arrangement the elastic layer can be compressed, whereby the electrode spacing can be reduced and the capacitance can be altered in a certain second degree.

* * * * *